United States Patent
Sambhy et al.

(10) Patent No.: US 9,073,323 B2
(45) Date of Patent: *Jul. 7, 2015

(54) PROCESS FOR THERMALLY STABLE OLEOPHOBIC LOW ADHESION COATING FOR INKJET PRINTHEAD FRONT FACE

(75) Inventors: Varun Sambhy, Penfield, NY (US); Kock-Yee Law, Penfield, NY (US); Hong Zhao, Webster, NY (US); Peter Michael Gulvin, Webster, NY (US); James M. Casella, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 264 days.

This patent is subject to a terminal disclaimer.

(21) Appl. No.: 13/275,255

(22) Filed: Oct. 17, 2011

(65) Prior Publication Data
US 2013/0096254 A1   Apr. 18, 2013

(51) Int. Cl.
| | | |
|---|---|---|
| C09D 175/08 | (2006.01) |
| B05D 3/02 | (2006.01) |
| B41J 2/16 | (2006.01) |
| C08G 18/50 | (2006.01) |
| C08G 18/79 | (2006.01) |
| C09D 175/04 | (2006.01) |

(52) U.S. Cl.
CPC .......... B41J 2/1606 (2013.01); C08G 18/5015 (2013.01); C08G 18/792 (2013.01); C09D 175/04 (2013.01); B41J 2/1623 (2013.01); B41J 2/1645 (2013.01)

(58) Field of Classification Search
USPC .......................................... 524/590; 427/379
See application file for complete search history.

(56) References Cited

U.S. PATENT DOCUMENTS

| | | |
|---|---|---|
| 4,704,420 A | 11/1987 | Federici et al. |
| 4,863,986 A | 9/1989 | Re et al. |
| 5,305,015 A | 4/1994 | Schantz et al. |
| 5,677,406 A | 10/1997 | Tazelaar et al. |
| 5,867,189 A | 2/1999 | Whitlow et al. |
| 6,071,564 A | 6/2000 | Marchetti et al. |
| 6,821,327 B2 | 11/2004 | Jaeger et al. |
| 7,211,131 B2 | 5/2007 | Banning et |
| 7,622,580 B2 | 11/2009 | Banning et al. |
| 7,655,310 B2 | 2/2010 | Trombetta |
| 7,699,922 B2 | 4/2010 | Breton et al. |
| 2004/0077887 A1 | 4/2004 | Banning et al. |
| 2004/0082801 A1 | 4/2004 | Jaeger et al. |
| 2004/0167249 A1 | 8/2004 | Banning et al. |
| 2005/0074686 A1 | 4/2005 | Bassi et al. |
| 2005/0140720 A1 | 6/2005 | Silverbrook |
| 2008/0194881 A1 | 8/2008 | Marchionni et al. |
| 2012/0044298 A1* | 2/2012 | Sambhy et al. ................. 347/45 |

* cited by examiner

*Primary Examiner* — Ling Choi
*Assistant Examiner* — Catherine S Branch
(74) *Attorney, Agent, or Firm* — Marger Johnson & McCollom PC (57) ABSTRACT

A coating for an ink jet printhead front face, wherein the coating comprises an oleophobic low adhesion coating having high thermal stability as indicated by less than about 15 percent weight loss when heated to up to 300° C., and wherein a drop of ultra-violet (UV) gel ink or a drop of solid ink exhibits a contact angle of greater than about 45° and sliding angle of less than about 30° with a surface of the coating, wherein the coating maintains the contact angle and sliding angle after the coating has been exposed to a temperature of at least 200° C. for at least 30 minutes.

14 Claims, 4 Drawing Sheets

PROCESS FOR THERMALLY STABLE OLEOPHOBIC LOW ADHESION COATING FOR INKJET PRINTHEAD FRONT FACE

CROSS-REFERENCE TO RELATED APPLICATIONS

Copending application U.S. Ser. No. 12/625,442, filed Nov. 24, 2009, entitled "COATING FOR AN INK JET PRINTHEAD FRONT FACE," Xerox Ref. 20090325-US-NP;

Copending application U.S. Ser. No. 12/860,660, filed Aug. 20, 2010, entitled "THERMALLY STABLE OLEOPHOBIC LOW ADHESION COATING FOR INKJET PRINTHEAD FRONT FACE," Xerox Ref. 20100120-US-NP.

Copending application U.S. Ser. No. 13/275 245, filed simultaneously with this application, entitled, "SELF CLEANING PRINTHEAD," Xerox Ref. No. 20101560, the disclosure of each is incorporated herein by reference in their entirety.

BACKGROUND

In many solid ink printheads, the nozzle plate and jet stacks typically consist of stainless steel plates. The nozzle plate has an array of small holes, or nozzles, also sometimes referred to as jets, through which the ink exits the jet stack. Stainless steel nozzle plates and other plates in the jet stack are being replaced with flexible, polymer layers such as polyimide. In some instances, the polyimide film receives an anti-wetting coating, is bonded to a stainless steel aperture plate, and then a laser ablates the array of apertures into the polyimide film.

Figure 1:
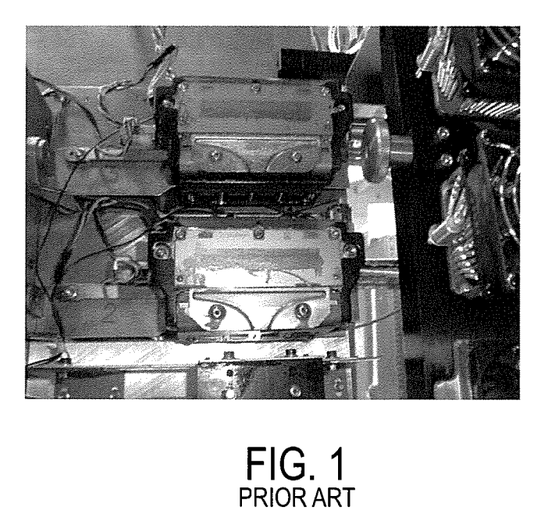
FIG. 1 shows an example of a contaminated front face of a printhead.

Drooling nozzles, wetting and adhesion of ink on the printhead front face lead to missing and misdirectional jetting along with poor IQ. Drooling nozzles weep ink when the internal pressure of the printhead exceeds a particular pressure, typically measured in inches or water. The higher pressure the nozzles can maintain without weeping leads to improved performance. Wetting occurs when the front face of the printhead remains wet after printing. This ink that remains on the printhead can block the nozzles resulting in missing nozzles and misdirectional printing. FIG. 1 shows a photograph of such a contaminated printhead.

Currently, one approach to these issues uses an active cleaning blade system. The system purges ink from the printhead and a wiper blade wipe then wipes the ink off of the front face Ink purges typically occur after the system detects missing jets and after a power-down when the ink has frozen or solidified, shrunk and drawn air into the system. The ink purge expels contamination, trapped air and clears the nozzles, and then the wipers clean off the front face. To meet future EnergyStar® requirements, the printers will shutdown nightly during which the printheads, reservoirs, and umbilicals do not receive heat. With an expected printhead lifetime of 6 years, daily purges will require roughly 2000 purge and wipe cycles. This increase in wipes means that any anti-wetting coating will have to survive and maintain their beneficial properties for over 2000 cycles.

The anti-wetting coating must have high contact angle to maintain adequate drool pressure and low slide angle to maintain the easy clean/self clean feature. This will lead to printhead cartridges with low or no maintenance, high engine reliability and low run cost. The stack manufacturing process generally involves high temperatures and pressures, so the coating must maintain these properties under these conditions, typically 290° C. and 350 psi for approximately 30 minutes. Generally low-adhesion coatings having low slide angles have shown to slide off the printhead front face cleanly under gravity.

Oleophobic, low adhesion surface coatings have provided significant performance improvements. However, even with such a coating, printhead front face will undergo several wipe cycles. Current coatings, while having good thermal and ink stabilities, may suffer from lower mechanical robustness than may be desirable.

DETAILED DESCRIPTION OF THE EMBODIMENTS

Embodiments described here include oleophobic low adhesion surface coatings usable for an ink jet printhead front face, wherein the surface coatings comprise an oleophobic low adhesion polymeric material. When an ink jet printhead front face surface has such a coating, jetted drops of ultra-violet (UV) gel ink, referred to also as "UV ink," or jetted drops of solid ink exhibit low adhesion towards the surface coating. The adhesion of an ink drop towards a surface can be determined by measuring the sliding angle of the ink drop, where the sliding angle is the angle at which a surface is inclined relative to a horizontal position when the ink drop begins to slide over the surface without leaving residue or stain behind. The lower the sliding angle, the lower the adhesion between the ink drop and the surface.

As used here, the term "low adhesion" means a low sliding angle of less than about 30° when measured with ultra-violet curable gel ink or solid ink, with the printhead front face surface as the surface. In some embodiments, a low sliding angle is less than about 25°, in other embodiments the low sliding angle is less than about 20°, when measured with ultra-violet curable gel ink or solid ink with the printhead front face surface as the surface. In yet other embodiments, a low sliding angle is greater than about 1° when measured with ultra-violet curable gel ink or solid ink, with the printhead front face surface as the surface.

As used here, an oleophobic low adhesion surface coating is "thermally stable" when drops of ultra-violet gel ink or solid ink exhibit low adhesion towards the surface coating after the surface coating has been exposed to high temperatures, such as temperatures in a range between 180° C. and 325° C., or in a range between about 180° C. and about 325° C., and high pressures, such as pressures in a range between 100 psi and 400 psi, or in a range between about 100 psi and about 400 psi) for extended periods of time. Extended periods of time may lie in the range between 10 minutes and 2 hours, or in a range between about 10 minutes and about 2 hours.

In one embodiment, the surface coating is thermally stable after the surface coating has been exposed to a temperature of or about 290° C. at pressures of or about 300 psi 300 psi for or about 30 minutes. The surface coating can be bonded to a stainless steel aperture brace at high temperature and high pressure without any degradation. Therefore the resulting printhead can prevent ink contamination because ink droplets can roll off the printhead front face, leaving behind no residue.

In some embodiments, a printing apparatus includes an ink jet printhead having a front face and an oleophobic low adhesion surface coating disposed on a surface of the front face. The oleophobic low adhesion surface coating includes an oleophobic low adhesion polymeric material configured such that jetted drops of ultra-violet gel ink or jetted drops of solid ink exhibit a contact angle greater than or about 45°. In one embodiment, jetted drops of ultra-violet gel ink or jetted drops of solid ink exhibit a contact angle greater than or about 55°. In another embodiment, jetted drops of ultra-violet gel ink or jetted drops of solid ink exhibit a contact angle greater than or about 65°. In one embodiment, there is no upper limit to the contact angle exhibited between the jetted drops of ultra-violet gel ink or jetted drops of solid ink and the surface coating. In another embodiment, the jetted drops of ultra-violet gel ink or jetted drops of solid ink exhibit a contact angle less than or about 150°.

In yet another embodiment, the jetted drops of ultra-violet gel ink or jetted drops of solid ink exhibit a contact angle less than or about 90°. When ink is filled into the printhead, it is desired to maintain the ink within the nozzle until it is time to eject the ink. Generally, the greater the ink contact angle the better, meaning higher, the drool pressure. Drool pressure relates to the ability of the aperture plate to avoid ink weeping out of the nozzle opening when the pressure of the ink tank or the reservoir increases. Maintaining a higher pressure without weeping allows for faster printing when a print command is given.

In some embodiments, the coatings are thermally stable and provide this property even after exposure to high temperatures, such as temperatures in a range between 180° C. and 325° C., or in a range between about 180° C. and about 325° C., and high pressures, such as pressures in a range between 100 psi and 400 psi, or in a range between about 100 psi and about 400 psi, for extended periods of time, between 10 minutes and 2 hours, or in a range between about 10 minutes and about 2 hours. This maintains high drool pressures.

In one embodiment, the coatings are thermally stable and provide this property even after exposure to a temperature of or about 290° C. at pressures of or about 300 psi for or about 30 minutes, allowing maintenance of high drool pressures. Advantageously, the oleophobic low adhesion surface coatings described herein provide, in combination, low adhesion and high contact angle for ultra-violet curable gel ink and solid ink, which further provides the benefit of improved drool pressure or reduced or eliminated weeping of ink out of the nozzle.

In some embodiments, the oleophobic low adhesion surface coating is a reaction product of a reactant mixture that includes at least one isocyanate and a functionalized fluorocrosslinking material.

Suitable isocyanates include monomeric, oligomeric, and polymeric isocyanates, including, but not limited to, those of the general formula $R_1$—$(NCO)_n$ wherein $R_1$ is an alkyl group, an alkylene group, an aryl group, an arylene group, an arylalkyl group, an arylalkylene group, an alkylaryl group or an alkylarylene group.

In one embodiment, $R_1$ is an alkyl or an alkylene group (including linear and branched, saturated and unsaturated, cyclic and acyclic, and substituted and unsubstituted alkyl and alkylene groups, and wherein heteroatoms, such as oxygen, nitrogen, sulfur, silicon, phosphorus, or the like either may or may not be present in the alkyl or alkylene group). In one embodiment, the alkyl or alkylene group has at least about 8 carbon atoms. In another embodiment, the alkyl or alkylene group has at least about 10 carbon atoms. In another embodiment, the alkyl or alkylene group has at least about 12 carbon atoms. In one embodiment, the alkyl or alkylene group has no more than about 60 carbon atoms. In another embodiment, the alkyl or alkylene group has no more than about 50 carbon atoms. In yet another embodiment, the alkyl or alkylene group has no more than about 40 carbon atoms. It will be appreciated, however, that the number of carbon atoms can be outside of these ranges.

In one embodiment, $R_1$ is an aryl or an arylene group (including substituted and unsubstituted aryl and arylene groups, and wherein heteroatoms, such as oxygen, nitrogen, sulfur, silicon, phosphorus, or the like either may or may not be present in the aryl or arylene group). In one embodiment, the aryl or arylene group has at least about 5 carbon atoms. In another embodiment, the aryl or arylene group has at least about 6 carbon atoms. In one embodiment, the aryl or arylene group has no more than about 50 carbon atoms. In another embodiment, the aryl or arylene group has no more than about 25 carbon atoms. In yet another embodiment, the aryl or arylene group has no more than about 12 carbon atoms. It will be appreciated, however, that the number of carbon atoms can be outside of these ranges.

In one embodiment, $R_1$ is an arylalkyl or an arylalkylene group (including substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein heteroatoms, such as oxygen, nitrogen, sulfur, silicon, phosphorus, or the like either may or may not be present in either the aryl or the alkyl portion of the arylalkyl or arylalkylene group). In one embodiment, the arylalkyl or arylalkylene group has at least about 6 carbon atoms. In another embodiment, the arylalkyl or arylalkylene group has at least about 7 carbon atoms. In one embodiment, the arylalkyl or arylalkylene group has no more than about 60 carbon atoms. In another embodiment, the arylalkyl or arylalkylene group has no more than about 40 carbon atoms. In yet another embodiment, the arylalkyl or arylalkylene group has no more than about 30 carbon atoms. It will be appreciated, however, that the number of carbon atoms can be outside of these ranges.

The substituents on the substituted alkyl, alkylene, aryl, arylene, arylalkyl, arylalkylene, alkylaryl, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, or the like, wherein two or more substituents can be joined together to form a ring, and n is an integer representing the number of isocyanate groups, being, for example, 1, 2, 3, or the like in the instance of monomeric isocyanates and having no necessary upper limit in the case of polymeric isocyanates.

Examples of diisocyanates include isophorone diisocyanate (IPDI), of the formula 2,4-toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), of the formula:

naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; 2,2,4-trimethylhexamethylene diisocyanate and 2,4,4-trimethylhexamethylene diisocyanate, of the formulae:

tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; or the like, as well as mixtures thereof. Examples of triisocyanates or their equivalents include triphenyl methane-4,4',4"-triisocynate; Tris(p-isocynatophenyl) thiophosphate; trimethylolpropane trimer of TDI, or the like, isocyanurate trimers of TDI, HDI, IPDI, or the like, and biuret trimers of TDI, HDI, IPDI, or the like, as well as mixtures thereof. Examples of higher isocyanate functionalities include copolymers of TDI/HDI, or the like, and MDI oligomers, as well as mixtures thereof. In some embodiments, the isocynate moiety can be allophanate modified MDI or polymers of allophanate modified MDI. In some embodiments, the isocynate moiety can also be a (per)fluoropolyethereal prepolymer having polyisocyanic functionality as described in prior art (U.S. Pat. Nos. 4,863,986; 4,704,420; 6,071,564), and previously available commercially as Fluorobase-Z. In some embodiments, suitable isocyanates may be obtained under the name Desmodur® Mondur® or Impranil® for example, Desmodur N 3300®, Desmodur N 3790®, available from Bayer Materials Science, or the like or mixtures thereof.

Suitable perfluoropolyether compounds include mono- or di-hydroxyl functionalized monomeric, oligomeric, and polymeric perfluoropolyether compounds. Examples of suitable dihydroxy functionalized perfluoropolyether compounds include (but are not limited to) those of the general formula:

wherein a is an integer in a range between 0 and 20, and b and c are integers in a range between 0-50, provided that at least one of b and c are not zero. In one embodiment, a suitable di-functionalized perfluoropolyether compound can be represented by the formula:

In some embodiments, suitable dihydroxy functionalized perfluoropolyether compounds may be obtained under the name Fluorolink®, for example, Fluorolink D®, Fluorolink D10®, Fluorolink D10H®, Fluorolink E10®, Fluorolink E10H®, available from Solvay Solexis, or the like or mixtures thereof.

Any suitable reaction conditions for making urethane compounds, or the like, or mixtures thereof, by condensing one or more of the perfluoropolyether compounds with one or more of the isocyanates can be used to prepare the polymer of the oleophobic low adhesion printhead front face coating. Typically (although not necessarily), the reaction can be carried out at various temperatures (for example, from about 25° C. to about 160° C.) in the presence of an optional reaction catalyst, such as dibutyltin dilaurate, bismuth tris-neodecanoate, cobalt benzoate, lithium acetate, stannous octoate, triethylamine, or the like. Other exemplary catalysts include RC catalysts from Rheine Chemie.

In one embodiment, the reaction conditions can be conducted in an inert atmosphere, such as argon or nitrogen gas or other suitable gases, to prevent oxidizing or yellowing of the reaction products and to prevent undesirable side reactions due to moisture. The reaction can be performed neat (i.e., without a solvent) or can optionally employ any desired or effective solvent. Examples of suitable solvents include xylene, toluene, benzene, chlorobenzene, hexafluorobenzene, nitrobenzene, dichlorobenzene, N-methylpyrrolidinone, dimethyl formamide, dimethyl sulfoxide, sulfolane, hexane, tetrahydrofuran, butyl acetate, amyl acetate, HFE 7200 (3M), HFE 7500 (3M), Solvosol (Dow) and the like, as well as mixtures thereof. Another example of a solvent that may be used is FCL 52 solvent, a fluorinated solvent available from Cytonix LLC.

The oleophobic low adhesion surface coating disclosed herein can be employed as an anti-wetting printhead front face coating for an inkjet printhead configured to eject ink onto a recording substrate. Any suitable recording substrate may be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

In embodiments described herein, the oleophobic low adhesion coatings are thermally stable, thereby providing a low sliding angle in a range between or about 1° and 30° or about 30°, and a high contact angle in a range between or about 45° and 150° or about 150° even after exposure to high temperatures such as temperatures in a range between or about 180° C. and 325° C. or about 325° C., and high pressures such as pressures in the range of or about 100 psi to or about 400 psi, for extended periods of time in a range of or about 10 minutes to or about 2 hours. In one embodiment, the oleophobic low adhesion coating is thermally stable after being exposed to a temperature of 290° C. at pressures of 300 psi for 30 minutes. The fabrication of high density Piezo printheads requires a high temperature, high pressure adhesive bonding step. Hence, it would be desirable for a frontface coating to withstand these high temperature and high pressure conditions. The stability of the oleophobic low adhesion surface coating described herein at high temperatures and high pressures is compatible with current printhead manufacturing processes.

When coated onto the front face of an inkjet printhead, the oleophobic low adhesion surface coating exhibits a sufficiently low adhesion with respect to the inks that are ejected from the inkjet printhead such that ink droplets remaining on the oleophobic low adhesion coating can slide off the printhead in a simple, self-cleaning manner. Contaminants such as dust, paper particles, etc., which are sometimes found on the front face of inkjet printheads, can be carried away from the inkjet printhead front face by a sliding ink droplet. The oleophobic low adhesion printhead front face coating can provide a self-cleaning, contamination-free inkjet printhead.

As used herein, the oleophobic low adhesion coating can exhibit a "sufficiently low wettability" with respect to inks that are ejected from an inkjet printhead when a contact angle between an ink and the oleophobic low adhesion coating is, in one embodiment, greater than about 45° and in another embodiment greater than about 55°.

The oleophobic low adhesion coating disclosed herein can be employed as an oleophobic low adhesion printhead front face coating for an inkjet printhead of any suitable inkjet printer, such as continuous inkjet printers, thermal drop-on-demand (DOD) inkjet printers, and piezoelectric DOD inkjet printers. As used here, the term "printer" encompasses any apparatus, such as a digital copier, bookmaking machine, facsimile machine, multi-function machine, and the like, which performs a print outputting function for any purpose.

The oleophobic low adhesion coating disclosed herein can be employed as an oleophobic low adhesion printhead front face coating for an inkjet printhead configured to eject any suitable ink such as, aqueous inks, solvent inks, UV-curable inks, dye sublimation inks, solid inks, etc. An exemplary inkjet printhead suitable for use with the oleophobic low adhesion coating disclosed herein is described with respect to FIG. 2.

Figure 2:
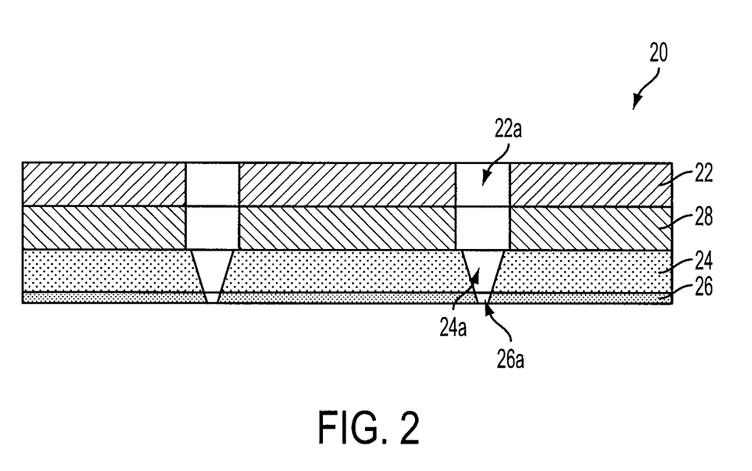
FIG. 2 shows a side view of an embodiment of a jet stack.

A typical inkjet printhead may include a nozzle plate typically bonded to a support brace. FIG. 2 shows an embodiment of a printhead jet stack having an anti-wetting coating. In this embodiment, an oleophobic, low adhesion coating 26 is bonded to a nozzle plate 24. The nozzle plate may be a polymer film, such as a polyimide film, bonded to an aperture support brace 22

The support brace 22 is formed of any suitable material such as stainless steel and include apertures 22a defined therein. The apertures 22a may communicate with an ink source (not shown). The nozzle plate 24 may be formed of any suitable material such as polyimide and include nozzles 24a defined therein. The nozzles 24a may communicate with the ink source via the apertures 22a such that ink from the ink source is jettable from the printhead 20 onto a recording substrate through a nozzle 24a.

In the illustrated embodiment, the nozzle plate 24 is bonded to the support brace 22 by an intervening adhesive material 28. The adhesive material 28 may be provided as a thermoplastic adhesive can be melted during a bonding process to bond the nozzle plate 24 to the support brace 22. Typically, the nozzle plate 24 and the oleophobic low adhesion coating 26 are also heated during the bonding process. Depending on the material from which the thermoplastic adhesive is formed, bonding temperature can be in a range between 180° C. and 325° C. (or in a range between about 180° C. and about 325° C.).

Conventional oleophobic low adhesion coatings tend to degrade when exposed to temperatures encountered during typical bonding processes or other high-temperature, high pressure processes encountered during fabrication of inkjet printheads. However, the oleophobic low adhesion coating 26 disclosed herein exhibits a sufficiently low adhesion (indicated by low sliding angles) and high contact angle with respect to an ink after it has been heated to the bonding temperature. The oleophobic low adhesion coating 26 can provide a self-cleaning, contamination-free inkjet printhead 20 with high drool pressure. The ability of the oleophobic low adhesion coating 26 to resist substantial degradation in desirable surface properties (e.g., including low sliding angle and high contact angle) upon exposure to elevated temperatures enables inkjet printheads having self-cleaning abilities while maintaining high drool pressure, to be fabricated using high-temperature and high pressure processes.

In one embodiment, the oleophobic low adhesion coating 26 may be formed on the substrate 32 by initially applying the reactant mixture that, as described above, includes at least one isocyanate and at least one perfluoropolyether compound. After the reactant mixture is applied to the substrate 32, the reactants are reacted together to form the oleophobic low adhesion coating 26. The reactants can be reacted together by, for example, curing the reactant mixture. In one embodiment, the reactant mixture is first cured at a temperature of about 130° C. for about 30 minutes to 2 hours followed by a high temperature post-cure at about 290° C. for about 30 minutes to 2 hours.

In one embodiment, the reactant mixture may be applied to the substrate 32 using any suitable method such as die extrusion coating, dip coating, spray coating, spin coating, flow coating, stamp printing, and blade techniques. An air atomization device such as an air brush or an automated air/liquid spray can be used to spray the reactant mixture. The air atomization device can be mounted on an automated reciprocator that moves in a uniform pattern to cover the surface of the substrate 32 with a uniform or substantially uniform amount of the reactant mixture. The use of a doctor blade is another technique that can be employed to apply the reactant mixture. In flow coating, a programmable dispenser is used to apply the reactant mixture.

Specific embodiments will now be described in detail. These examples are intended to be illustrative, and the claims are not limited to the materials, conditions, or process parameters set forth in these embodiments.

EXAMPLES

Example 1

1.3 grams of Fluorolink-D was dissolved 20 g of hexafluorobenzene. 0.01 g of dibutyltin dilaurate catalyst was added, and the resulting mixture was heated to 80° C. A second solution of isocyanate containing 0.1143 g of Desmodur 3300 and 0.14 g Desmodur 3790 was dissolved is hexafluorobenzene and added to the first solution slowly over a 2-hour period. The Fluorolink solution was kept heated at 80° C. during the adding process. The reactant mixture resulting from the adding process was kept at 80° C. and stirred overnight to complete the cross-linking reaction. The reactant mixture was cooled to room temperature and diluted with 40 g of FCL-52 (from Cytonix company). The resulting prepolymer solution was coated onto a polyimide substrate using a drawbar coater. The coated film was air dried for 5 minutes and then heat-cured in oven at 150° C. for 30 minutes. The final film was subjected to a second curing step in oven at 260° C. for 30 minutes resulting in coating 1.

Example 2

1.3 grams of Fluorolink-D was dissolved in 20 g of hexafluorobenzene. 0.01 g of dibutyltin dilaurate catalyst was added, and the resulting mixture was heated to 80° C. A second solution of isocyanate containing 0.28 g Desmodur 3790 was dissolved is hexafluorobenzene and added to the first solution slowly over a 2-hour period. The Fluorolink solution was kept heated at 80° C. during the adding process. The reactant mixture resulting from the adding process was kept at 80° C. and stirred overnight to complete the cross-linking reaction. The reactant mixture was cooled to room temperature and diluted with 40 g of FCL-52 (from Cytonix company). The resulting prepolymer solution was coated onto a polyimide substrate using a drawbar coater. The coated film was air dried for 5 minutes and then heat-cured in oven at 150° C. for 30 minutes. The final film was subjected to a second curing step in oven at 260° C. for 30 minutes resulting in coating 2.

Examples 1 and 2 result in a reactant solution that has 90% or more of the cross-linking completed prior to the coating, due in part to the mixing at elevated temperatures. Because of the high amount of cross-linking that occurs prior to the curing process, which completes substantially all of the cross-linking of the polymers, the resulting film has better thermal stability and mechanical robustness.

Example 3

23.4 grams of Fluorolink-D was added to a 3 neck round bottom flask fitted with an addition funnel, a temperature probe and a condensor. 135 mL of Novec 7200, 95 mL of ethyl acetate and 0.211 g of dibutyltin dilaurate catalyst were added to the 3 neck round bottom flask, and the contents were stirred and heated to a gentle reflux (~71° C.) under a nitrogen atmosphere. A second solution was prepared by dissolving 5.04 g of Desmodur 3790 in 185 mL of ethyl acetate and 63 mL of Novec 7200. This isocyanate solution was then transferred to the addition funnel connected to the round bottom flask, and was added dropwise to the Fluorolink solution over a 2-hour period at 71° C. The reactant mixture was then stirred overnight at 71° C. The reaction mixture was then cooled to room temperature and was filtered using a Millipore Opticap XL filter with pore size 0.2 microns to yield the coating formulation. The solid concentration of the coating formulation was approx. 5%. This coating formulation was coated onto a polyimide substrate using drawbar coater. The coated film was air dried for 5 minutes and then heat-cured in oven at 150° C. for 30 minutes. The final film was subjected to a second curing step in oven at 260° C. for 30 minutes resulting in coating 3.

Example 4

23.4 grams of Fluorolink-D was added to a 3 neck round bottom flask fitted with an addition funnel, a temperature probe and a condensor. 135 mL of Novec 7200, 95 mL of ethyl acetate and 0.211 g of dibutyltin dilaurate catalyst were added to the 3 neck round bottom flask, and the contents were stirred and heated to a gentle reflux (~71° C.) under a nitrogen atmosphere. A second solution was prepared by dissolving 2.07 g of Desmodur 3300 and 2.52 g of Desmodur 3790 in 185 mL of ethyl acetate and 63 mL of Novec 7200. This isocyanate solution was then transferred to the addition funnel connected to the round bottom flask, and was added dropwise to the Fluorolink solution over a 2-hour period at 71° C. The reactant mixture was then stirred overnight at 71° C. The reaction mixture was then cooled to room temperature and was filtered using a Millipore Opticap XL filter with pore size 0.2 microns to yield the coating formulation. The solid concentration of the coating formulation was approx. 5%. This coating formulation was coated on to a polyimide substrate using drawbar coater. The coated film was air dried for 5 minutes and then heat-cured in oven at 150° C. for 30 minutes. The final film was subjected to a second curing step in oven at 260° C. for 30 minutes resulting in coating 4.

Example 5

451 g of the coating formulation synthesized as described in example 3 was diluted from 5% to 3% solid concentration by adding 300 g of Novec 7200 solvent. The diluted solution was transferred to a round bottom flask, and a vigreaux distillation apparatus was then connected to the flask. The solution was heated till the solvents started distilling (at ~71-71° C.). Distillation was continued till aprrox. 559 g of distillate consisting of mixture of Novec 7200 and ethyl acetate was collected. The concentrated solution remaining behind in the flask was cooled to room temperature. The solid concentration of this concentrated coating formulation was approx. 12%. This coating formulation was coated onto a polyimide substrate using drawbar coater. The coated film was air dried for 5 minutes and then heat-cured in oven at 150° C. for 30 minutes. The final film was subjected to a second curing step in oven at 260° C. for 30 minutes resulting in coating 5.

Example 6

Coating formulation obtained as described in example 5 was coated on to a polyimide substrate using drawbar coater. The coated film was air dried for 5 min. It was then heat cured in oven under ambient condition by ramping from room temperature to 150° C. at 10C/min, holding at 15° C. for 30 min, ramping from 150° C. to 260° C. at 10C/min, and finally holding at 260° C. for 20 min resulting in coating 6.

Example 7

Coating formulation obtained as described in example 5 was coated on to a polyimide substrate using drawbar coater. The coated film was air dried for 5 min. It was then heat cured in oven under a nitrogen atmosphere by ramping from room temperature to 150° C. at 10C/min, holding at 15° C. for 30 min, ramping from 150° C. to 260° C. at 10C/min, and finally holding at 260° C. for 20 min resulting in coating 7.

Example 8

Coatings obtained as described in example 6 were further subjected to a wipe cleaning step as follows—a 2 inch wide foam brush (obtained from Lowes) was soaked in Novec 7200 solvent and was brushed across the surface of coating 6 in a single smooth painting like stroke. The coating was allowed to dry in air for 5 minutes. This resulted in solvent cleaned coating 8.

Example 9

Coatings obtained as described in example 7 were further subjected to a wipe cleaning step as follows—a 2 inch wide foam brush (obtained from Lowes) was soaked in Novec 7200 solvent and was brushed across the surface of coating 6 in a single smooth painting like stroke. The coating was allowed to dry in air for 5 minutes. This resulted in solvent cleaned coating 9.

Example 10

Coating formulation obtained as described in example 5 was coated on to a polyimide substrate using an extrusion die.

The coated film was air dried for 5 min. It was then heat cured using an infrared heater at 150° C. for 30 minutes followed by 260° C. for 30 minutes resulting in coating 10.

Example 11

A coating formulation having 5% solid concentration was prepared as exactly as described in example 3, except the amount of dibutyltin dilaurate catalyst added was 0.317 g. This coating formulation was then concentrated to approx. 12% by distilling as described in example 5. This coating formulation was coated on to a polyimide substrate using drawbar coater. The coated film was air dried for 5 minutes and then heat-cured in oven at 150° C. for 30 minutes. The final film was subjected to a second curing step in oven at 260° C. for 30 minutes resulting in coating 11.

Example 12

A coating formulation having 5% solid concentration was prepared as exactly as described in example 3, except the amount of dibutyltin dilaurate catalyst added was 0.423 g. This coating formulation was then concentrated to approx. 12% by distilling as described in example 5. This coating formulation was coated on to a polyimide substrate using drawbar coater. The coated film was air dried for 5 minutes and then heat-cured in oven at 150° C. for 30 minutes. The final film was subjected to a second curing step in oven at 260° C. for 30 minutes resulting in coating 12.

Example 13

23.4 grams of Fluorolink-D was added to a 3 neck round bottom flask fitted with an addition funnel, a temperature probe and a condensor. 135 mL of Novec 7500, 95 mL of butyl acetate and 0.211 g of dibutyltin dilaurate catalyst were added to the 3 neck round bottom flask, and the contents were stirred and heated 80° C. under a nitrogen atmosphere. A second solution was prepared by dissolving 5.04 g of Desmodur 3790 in 185 mL of butyl acetate and 63 mL of Novec 7500. This isocyanate solution was then transferred to the addition funnel connected to the round bottom flask, and was added dropwise to the Fluorolink solution over a 2-hour period at 80° C. The reactant mixture was then stirred overnight at 80° C. The reaction mixture was then cooled to room temperature and was filtered using a Millipore Opticap XL filter with pore size 0.2 microns to yield the coating formulation. The solid concentration of the coating formulation was approx. 5%. This coating formulation was coated on to a polyimide substrate using drawbar coater. The coated film was air dried for 5 minutes and then heat-cured in oven at 150° C. for 30 minutes. The final film was subjected to a second curing step in oven at 260° C. for 30 minutes resulting in coating 13.

Example 14

Contact angle and sliding angle of the coatings were determined on an OCA20 goniometer from Dataphysics, which consists of a computer-controlled automatic liquid deposition system, computer-controlled tilting base unit (TBU90E) and a computer-based image processing system. In a typical static contact angle measurement, about 10 microliter of solid ink (at typical ink jetting temperature of 115° C.) was gently deposited on the surface of the coating and the static angle was determined by the computer software (SCA20). Each reported data is an average of >5 independent measurements. Sliding angle measurement was done by tilting the base unit at a rate of 1°/sec with an about 10 microliter droplet of solid ink (at typical ink jetting temperature of 115° C.), using titling base unit TBU90E. The sliding angle is defined as the inclination angle at which the test drops (solid ink) began to slide off the coated polyimide substrate without leaving residue or stain behind.

In offline tests simulating adhesive bonding (stacking) step of printhead fabrication, coatings 1-13 were subjected to a high pressure and high temperature bonding step, e.g., at 290° C. at 350 psi for 30 min. The contact angle and sliding angle towards solid ink after the stacking step were determined as described before.

Ink aging experiments were performed by soaking coatings 1-13 after the stacking step in a mixture of molten cyan, magenta, yellow and black ink at 140° C. for 2 days. The contact angle and sliding angle after ink aging, were determined as described before. The contact angle and sliding angle data towards solid ink are summarized in Table 1.

TABLE 1

| | Surface Properties i.e. Contact Angle and (Sliding Angle) Towards Solid Ink After Condition (unit—degree) | | |
|---|---|---|---|
| Coating | Cured | Stacked | Inked |
| 1 | 72(1) | 72(4) | 63(18) |
| 2 | 73(2) | 71(6) | 60(18) |
| 3 | 74(1) | 75(3) | 65(11) |
| 4 | 73(1) | 74(2) | 66(15) |
| 5 | 73(1) | 74(1) | 63(17) |
| 6 | 74(1) | 74(2) | 65(9) |
| 7 | 73(1) | 75(1) | 73(7) |
| 8 | 74(8) | 67(4) | 62(17) |
| 9 | 77(8) | 68(8) | 66(19) |
| 10 | N.A | 75(1) | 68(12) |
| 11 | 73(1) | 73(1) | 70(4) |
| 12 | 72(1) | 74(1) | 69(7) |
| 13 | 73(8) | 75(11) | 63(13) |

Cured—Coating after final heat curing step
Stacked—Cured coating subjected to 350 psi/290 C. for 30 min
Inked—Cured and stacked coating subjected to CYMK solid ink exposure at 140 C. for 2 days Example 15

Contact angle and sliding angle of the coatings were determined on an OCA20 goniometer from Dataphysics, which consists of a computer-controlled automatic liquid deposition system, computer-controlled tilting base unit (TBU90E) and a computer-based image processing system. In a typical static contact angle measurement, about 10 microliter of UV ink (at typical ink jetting temperature of 80° C.) was gently deposited on the surface of the coating and the static angle was determined by the computer software (SCA20). Each reported data is an average of >5 independent measurements. Sliding angle measurement was done by tilting the base unit at a rate of 1°/sec with an about 10 microliter droplet for UV ink (at typical ink jetting temperature of 80° C.), using titling base unit TBU90E. The sliding angle is defined as the inclination angle at which the test drops (UV ink) began to slide off the coated polyimide substrate without leaving residue or stain behind.

In offline tests simulating adhesive bonding (stacking) step of printhead fabrication, coatings 8,9,11,12 were subjected to a high pressure and high temperature bonding step, e.g., at 290° C. at 350 psi for 30 min. The contact angle and sliding angle towards UV ink after the stacking step were determined as described before.

Ink aging experiments were performed by soaking coatings 8,9,11,12 after the stacking step in UV ink at 90° C. for 2 days. The contact angle and sliding angle after ink aging, were determined as described before. The contact angle and sliding angle data towards UV ink are summarized in Table 2.

TABLE 2

| Coating | Surface Properties i.e. Contact Angle and (Sliding Angle) Towards Solid Ink After Condition (unit—degree) | | |
|---|---|---|---|
| | Cured | Stacked | Inked |
| 8 | | 76(24) | 69(28) |
| 9 | | 75(21) | 69(19) |
| 11 | 61(0) | 61(2) | 71(12) |
| 12 | 59(0) | 63(0) | 71(17) |

Cured—Coating after final heat curing step
Stacked—Cured coating subjected to 350 psi/290 C. for 30 min
Inked—Cured and stacked coating subjected to UV ink exposure at 90 C. for 2 days Example 16

The printhead for the experiments consisted of the thin film nozzle plate adhered to the aperture brace. Ink was purged through the nozzles and a motor drive wiper blade was used to wipe ink of the surface of the nozzle plate. The pressure at which ink started drooling was recorded after each purge-wipe cycle. The drool pressure performance is given in table 3. This provides evidence that coating 2 could perform well even after 4000 wiping cycles.

TABLE 3

| Number of wipes | Drool Pressure in inches of water |
|---|---|
| 0 | 6.5 |
| 1000 | 5.7 |
| 2000 | 5 |
| 3000 | 4.5 |
| 4000 | 4.3 |

The results indicate that these coatings exhibit high ink contact angle and low sliding angle. It is expected that these coatings will offer self-clean and easy cleaning features when used as an anti-wetting coating in printheads. The surface properties of these coatings remain unchanged after the stack press and ink soak, indicative of long functional life.

Figure 3:
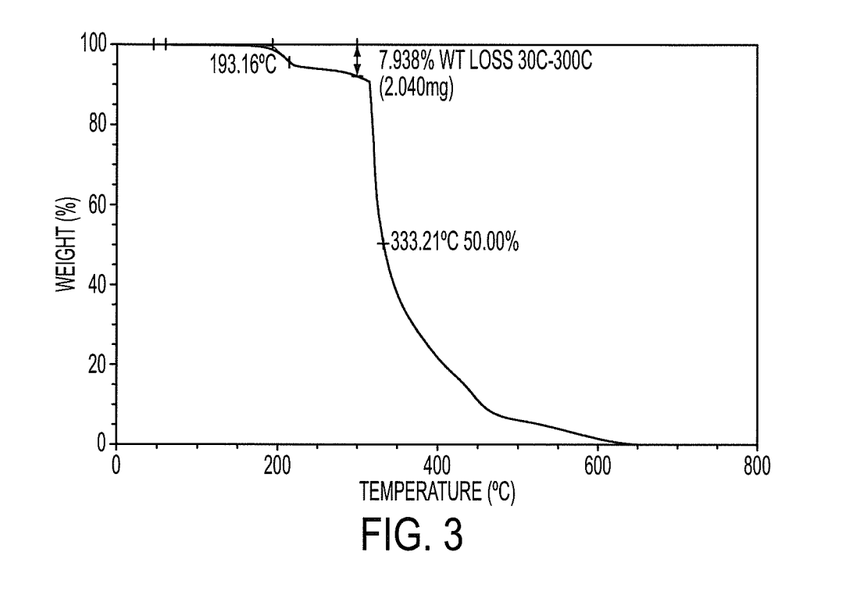
FIG. 3 shows a graph of thermal stabilities of embodiments of an oleophobic, low adhesion coating.
Figure 4:
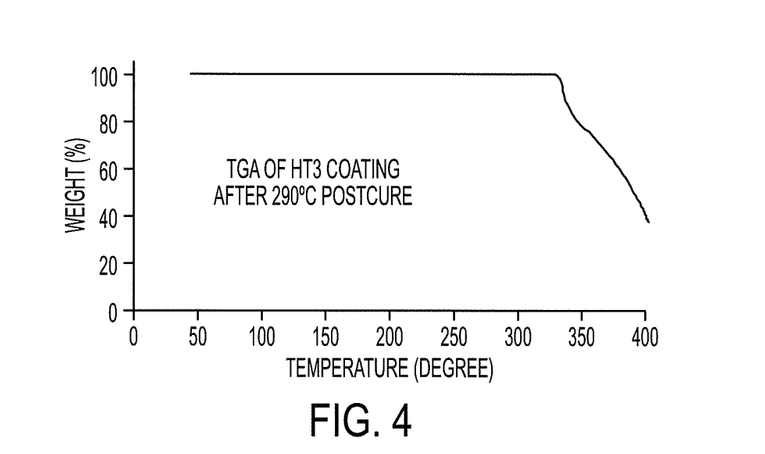
FIG. 4 shows a graph of thermal stability of an embodiment of an oleophobic, low adhesion coating.

The thermal stabilities of both the 130° C. cured film and the 290° C. post-cured film were studied by TGA (thermogravimetric analysis) and FIG. 3 shows the data. The results show that the 130° C. cured film lost about 10% of its weight between 30-300° C. Since the 290° C. post-cured film has demonstrated absolute stability up to approximately 315° C., as shown in FIG. 4. The initial weight loss appears to result from vaporization of small amounts of unreacted materials or decomposition of low molecular weight species or a combination of both.

Figure 5:
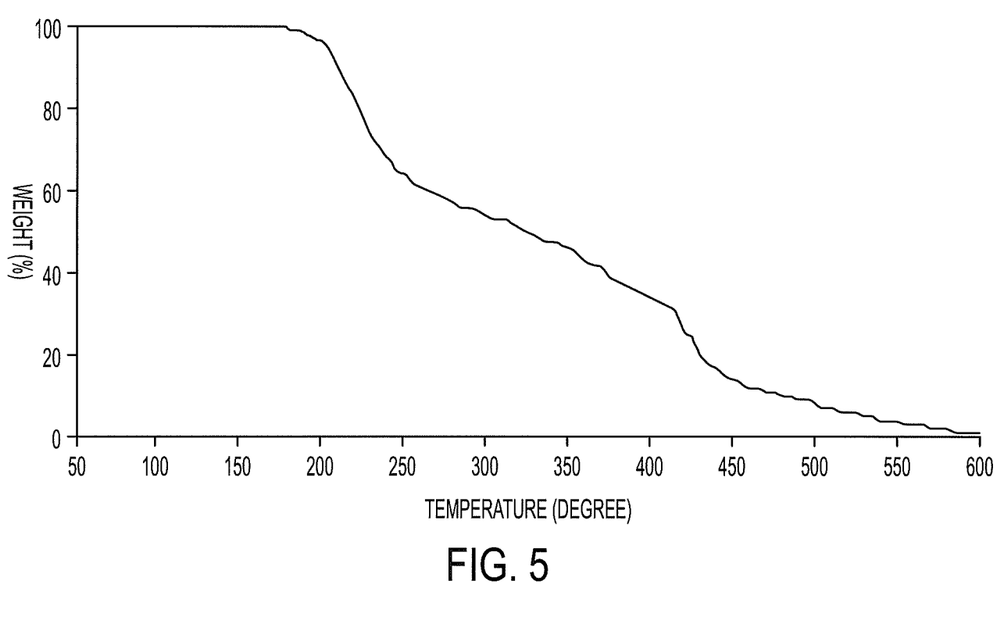
FIG. 5 shows a graph of thermal stability of an embodiment of an oleophobic, low adhesion coating.

FIG. 5 shows the TGA result for a previous coating, disclosed in U.S. patent application Ser. No. 12/860,660, filed Aug. 20, 2010 (HT2), showing it to be less thermally stable and having significant weight loss, around 51% from 30-300° C. during the TGA scan for the 130° C. cured film. The thickness measurement of the film also demonstrated the weight loss because the film as-coated measured approximately 4 micrometers (m) thick and after the 290° C. post-curing, the film measured approximately 1.4 μm. This indicates that the coating disclosed here in the above Examples, referred to as HT3 is a much more stable polymer. The retention of thickness allows the film to withstand the high number of wipe cycles.

Figure 6:
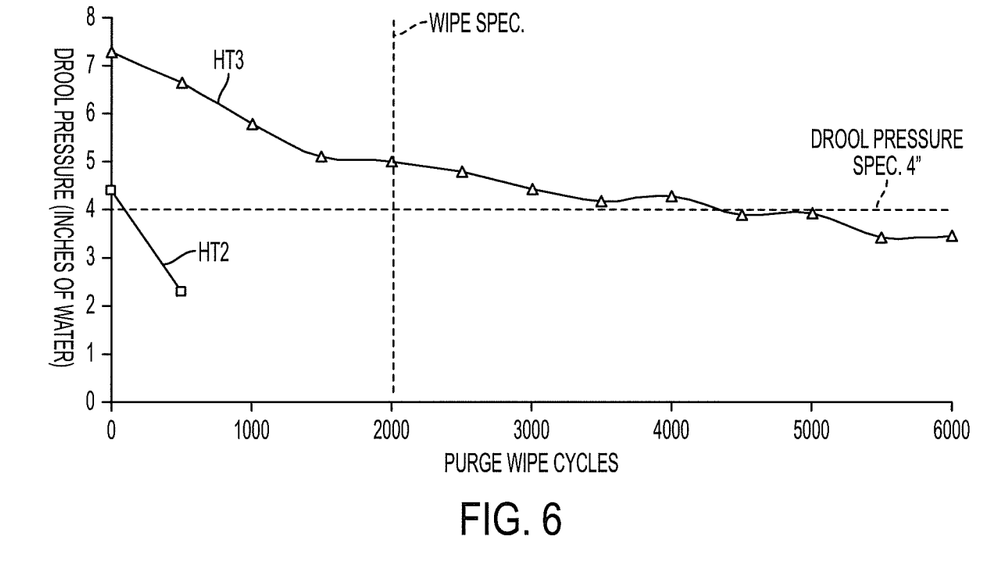

In further tests, printhead prototypes were coated with an HT3 coating and an HT2 coating and the purge-wipe was evaluated. FIG. 6 shows these results. They indicate that the HT3 coating meets a 2000 wipe cycle criteria with significant improvement over the HT2 film. The HT3 film performed well even after 6000 cycles.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A coating for an ink jet printhead front face, wherein the coating comprises:
    an oleophobic cross-linked low adhesion coating having high thermal stability as indicated by less than about 15 percent weight loss when heated to up to 300° C., and wherein a drop of ultra-violet (UV) gel ink or a drop of solid ink exhibits a contact angle of greater than about 45° and sliding angle of less than about 30° with a surface of the coating after curing, wherein the coating maintains the contact angle and sliding angle after the coating is stacked after curing and has been exposed to a temperature of at least 200° C. for at least 30 minutes, and the coating maintains a drool pressure of at least 5 inches of water after 2000 wipes.

2. The coating of claim 1, wherein the sliding angle is less than about 20°.

3. The coating of claim 1, wherein the coating exhibits a contact angle of greater than about 45° for a drop of UV gel ink or a drop of solid ink with the surface of the oleophobic low adhesion coating after the oleophobic low adhesion coating has been exposed to the temperature for at least 30 minutes.

4. The coating of claim 1, wherein the contact angle is greater than about 55°.

5. The coating of claim 1, wherein the coating exhibits a contact angle of greater than about for 45° for a drop of UV gel ink or a drop of solid ink with the surface of the oleophobic low adhesion coating after the coating has been exposed to:
    a first curing treatment at a temperature in a range between 130° C. and 150° C. for a period of time in a range between 30 minutes and 2 hours; and
    a second curing treatment at a temperature in a range between 250° C. and 300° C. for a period of time in a range between 15 minutes and 60 minutes.

6. The coating of claim 1, wherein the coating exhibits a contact angle of greater than about 45° and a sliding angle of less than 30° for a drop of UV gel ink or a drop of solid ink with the surface of the oleophobic low adhesion coating after the coating has been exposed to a ramp curing treatment by:
    heating from room temperature to a temperature in range between 130° to 150° C. at a heating rate between 1° to 10° C. per min and holding at that temperature for 30 to 120 min, followed by heating to a temperature in range between 250° to 300° C. at a heating rate between 1° to 10° C. per min and holding at that temperature for 15 to 60 minutes.

7. The coating of claim 1, wherein the coating exhibits a contact angle of greater than about 45° and a sliding angle of less than 30° for a drop of UV gel ink or a drop of solid ink with the surface of the oleophobic low adhesion coating after the coating has been soaked in molten solid ink or UV gel ink at a temperature in a range between 90° C. and 150° for 2 days.

8. The coating of claim 1, wherein the coating exhibits a contact angle of greater than about 45° and a sliding angle of less than 30° for a drop of UV gel ink or a drop of solid ink with the surface of the oleophobic low adhesion coating after the coating was exposed to the temperature at a pressure of at least 100 psi.

9. The coating of claim 8, wherein the coating exhibits a contact angle of greater than about 45° and a sliding angle of less than 30° for a drop of UV gel ink or a drop of solid ink with a surface of the oleophobic low adhesion coating after the coating was exposed to a temperature less than 300° C. at a pressure of less than 400 psi.

10. The coating of claim 1, wherein the oleophobic low adhesion coating comprises:
a first isocyanate compound; and
a hydroxyl functionalized perfluoropolyoxyalkane crosslinking material.

11. The coating of claim 10, wherein the first isocyanate compound is at least one selected from the group consisting of diphenylmethane diisocyanate (MDI), toluene diisocyanate (TDI), hexamethylene diisocyanate (HDI), isophorone diisocyanate (IPDI), hydrogenated MDI, tetra-methyl xylene diisocyanate, naphthalene diisocyanate, cyclohexylene diisocyanate, trimethylhexamethylene diisocyanate, bis(4-isocyanatocyclohexyl) methane, uretidione dimers of monomeric diisocynates of one or more of HDI, IPDI, TDI and MDI, cyclotrimerized isocyanurates of monomeric diisocynates of one or more of HDI, IPDI and TDI, oligomers, polymers or copolymers containing isocyanate (—NCO) functional groups, and a mixture thereof.

12. The coating of claim 10, wherein the hydroxyl functionalized perfluoropolyoxyalkane crosslinking material comprises at least one dihydroxy perfluoropolyoxyalkane compound of general structure $HOCH_2CF_2O(CF_2CF_2O)_b(CF_2O)_cCF_2CH_2OH$, having molecular weight in range of 500 to 5000 AMU, and where a and b are intergers in range between 0 and 50.

13. The coating of claim 10, wherein the oleophobic low adhesion coating further comprises a second isocyanate compound different from the first isocyanate compound.

14. The coating of claim 13, wherein the second isocyanate compound is at least one selected from the group consisting of diphenylmethane diisocyanate (MDI), toluene diisocyanate (TDI), hexamethylene diisocyanate (HDI), isophorone diisocyanate (IPDI), hydrogenated MDI, tetra-methyl xylene diisocyanate, naphthalene diisocyanate, cyclohexylene diisocyanate, trimethylhexamethylene diisocyanate, bis(4-isocyanatocyclohexyl) methane, uretidione dimers of monomeric diisocynates of one or more of HDI, IPDI, TDI and MDI, cyclotrimerized isocyanurate of monomeric diisocynates of one of more of HDI, IPDI and TDI, oligomers, polymers or copolymers containing isocyanate (—NCO) functional groups, and a mixture thereof.

* * * * *